US009541144B2

(12) United States Patent
Sugai et al.

(10) Patent No.: US 9,541,144 B2
(45) Date of Patent: Jan. 10, 2017

(54) VEHICULAR DISC BRAKE ROTOR AND MANUFACTURING METHOD OF VEHICULAR DISC BRAKE ROTOR

(71) Applicant: AKEBONO BRAKE INDUSTRY CO., LTD., Tokyo (JP)

(72) Inventors: Yoshiyuki Sugai, Tokyo (JP); Katsuji Seki, Tokyo (JP); Takuya Takada, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/013,468

(22) Filed: Aug. 29, 2013

(65) Prior Publication Data
US 2014/0060983 A1    Mar. 6, 2014

(30) Foreign Application Priority Data

Aug. 31, 2012  (JP) ................. 2012-192619
Dec. 13, 2012  (JP) ................. 2012-272755

(51) Int. Cl.
*F16D 65/12* (2006.01)
*C23C 8/30* (2006.01)
*C23C 8/32* (2006.01)
*C23C 8/80* (2006.01)

(52) U.S. Cl.
CPC ............ *F16D 65/127* (2013.01); *C23C 8/30* (2013.01); *C23C 8/32* (2013.01); *C23C 8/80* (2013.01); *F16D 65/125* (2013.01)

(58) Field of Classification Search
CPC ........ F16D 65/125; F16D 65/127; C23C 8/30; C23C 8/32; C23C 8/80

USPC ................................................... 188/218 XL
See application file for complete search history.

(56) References Cited

U.S. PATENT DOCUMENTS

| 5,679,411 A | 10/1997 | Hoppe |
| 2008/0000550 A1* | 1/2008 | Holly et al. ............... 148/217 |
| 2008/0118763 A1 | 5/2008 | Balow et al. |
| 2010/0044170 A1* | 2/2010 | Simpson et al. ....... 188/218 XL |

(Continued)

FOREIGN PATENT DOCUMENTS

| CN | 102732820 A | * 10/2012 |
| DE | 19938009 C1 | 10/2000 |

(Continued)

OTHER PUBLICATIONS

Totten, George, E., et al., "Design of Nitrided and Nitrocarburized Materials," Handbook of Metallurgical Process Design, New York: Marcel Dekker, 2004, 573.

(Continued)

*Primary Examiner* — Melanie Torres Williams
(74) *Attorney, Agent, or Firm* — Drinker Biddle & Reath LLP

(57) ABSTRACT

A vehicular disc brake rotor is provided with a cast-iron base, a nitrogen diffusion layer formed on the cast-iron base, a nitrogen compound layer formed on the nitrogen diffusion layer, and an iron oxide layer including $Fe_3O_4$ and formed on the nitrogen compound layer. In a burnish and a first re-burnish of a "Passenger car-Braking device-Dynamometer test procedures" (which is based on JASO C 406:2000), a change ratio of a frictional coefficient between the burnish and the first re-burnish is 10% or less.

8 Claims, 7 Drawing Sheets

(56) References Cited

U.S. PATENT DOCUMENTS

| | | | |
|---|---|---|---|
| 2011/0079326 A1* | 4/2011 | Hanna et al. | 148/211 |
| 2011/0151238 A1 | 6/2011 | Holly et al. | |
| 2011/0186186 A1* | 8/2011 | Fukazawa et al. | 148/525 |
| 2011/0293849 A1* | 12/2011 | Lembach et al. | 427/535 |
| 2013/0133995 A1* | 5/2013 | Hanna et al. | 188/218 XL |
| 2013/0284318 A1* | 10/2013 | Lee et al. | 148/217 |
| 2014/0149053 A1* | 5/2014 | Sun et al. | 702/33 |

FOREIGN PATENT DOCUMENTS

| | | |
|---|---|---|
| JP | 53-371 | 1/1978 |
| JP | 3-285058 A | 12/1991 |
| JP | 6-307471 A | 11/1994 |
| JP | 3303741 B2 | 7/2002 |
| JP | 2010-53926 A | 3/2010 |

OTHER PUBLICATIONS

U.S. Office Action dated Jan. 15, 2016 that issued in U.S. Appl. No. 14/013,403 including a Double Patenting Rejection on pp. 3-7.
Japanese Automobile Standard, "Passenger Car—Braking Device—Dynamometer Test Procedures," JASO C406: 2000, Mar. 1, 2000, pp. 1-9.
Extended European Search Report issued Mar. 8, 2016 in European Application No. 13181982.3.
Extended European Search Report issued Mar. 16, 2016 in European Application No. 13181985.6.

\* cited by examiner

VEHICULAR DISC BRAKE ROTOR AND MANUFACTURING METHOD OF VEHICULAR DISC BRAKE ROTOR

BACKGROUND OF THE INVENTION

Field of the Invention

The invention relates to a method of manufacturing a cast-iron vehicular disc brake rotor.

Related Art

A frictional surface of a cast-iron friction member that is used for a sliding part such as a vehicular disc brake rotor, a brake drum, a machine tool and the like is required to have high corrosion resistance and high wear resistance. Therefore, the surface of the cast-iron friction member has been coated with a coating film or zinc phosphate coating. However, the coating film or the coating is worn or delaminated over long time, so that it is difficult to secure the sufficient corrosion resistance and wear resistance.

Compared to the above, a technology of performing a nitrocarburizing treatment for the frictional surface of the cast-iron friction member has been studied and utilized. The nitrocarburizing treatment is a surface treatment of enabling interstitial diffusion of nitrogen and carbon at the same time at a treatment temperature of A1 transformation point (727° C.) or lower, typically 550° C. to 580° C. In the nitrocarburizing treatment, since a hard layer of a nitrogen compound is formed on the outermost surface, it is possible to improve the corrosion resistance and wear resistance of the cast-iron friction member. Also, since a phase transformation is not accompanied in the nitrocarburizing treatment, the strain is less caused, compared to a carburization treatment and the like. As the nitrocarburizing treatment, a salt-bath nitrocarburizing treatment method, a gas nitrocarburizing treatment method, a plasma nitriding treatment method and the like may be exemplified.

For example, JP-A-H06-307471 and JP-A-2010-53926 disclose performing a nitrocarburizing treatment on a surface of a cast-iron disc brake rotor so as to form a Fe—C—N based compound layer on the surface by the salt-bath nitrocarburizing treatment, thereby improving the corrosion resistance and wear resistance. However, the salt-bath nitrocarburizing treatment has a problem in terms of safety and environmental load because harmful cyanide is used. Also, the salt-bath nitrocarburizing treatment has a problem that a porous layer is apt to be formed on the outermost surface of the compound layer.

JP-B2-3303741 discloses a gas nitrocarburizing treatment in which nitrocarburizing treatment processes under nitriding atmosphere of 200 Torr or lower including ammonia gas at a treatment temperature of 450° C. to 560° C. are performed two times interposing a diffusion treatment process therebetween. In this method, the harmful cyanide is not used, and the compound layer to be formed on the surface of the cast-iron friction member can be made to be dense. Also, since it is possible to suppress a thickness of the compound layer from being excessively increased, it is possible to improve the surface durability.

However, when the cast-iron friction member having the nitrogen compound layer formed on the surface thereof by the above method is exposed to outside environments over a long period, red rust ($Fe_2O_3$) may be formed on the surface due to influences of temperature and humidity. Even when the surface of the vehicular disc brake rotor is subject to the nitrocarburizing treatment, if the surface is eroded by the red rust ($Fe_2O_3$), vibration may occur or a braking force may be lowered upon braking. Also, in recent years, an aluminum wheel having a high design property has been much increased. Regarding this, when the red rust ($Fe_2O_3$) is present on a surface of the rotor, it can be securely seen even from the outside with naked eyes, so that an outward appearance of a vehicle is deteriorated.

Regarding the above problems, it is efficient to further form an iron oxide layer having $Fe_3O_4$ as a main component, which is referred to as black rust, on the surface of the nitrogen compound layer obtained by the nitrocarburizing treatment. Since the iron oxide layer is uniform and compact, it can effectively prevent the red rust ($Fe_2O_3$) from being formed on the surface of the iron-cast friction member.

As disclosed in JP-A-H03-285058, the iron oxide layer is formed by a method referred to as homo treatment in which a target product is exposed to vapor of 400° C. to 500° C. for 1 to 1.5 hours. However, it is difficult to set conditions of the homo treatment. Thus, when the temperature is too high or the treatment time is too long, the red rust ($Fe_2O_3$) is formed. Therefore, it is very difficult to form a uniform and compact black iron oxide layer over the entire frictional surface of the iron-cast friction member.

As a method replacing the homo treatment, JP-B-S53-000371 discloses a method of treating a steel material in a mixed gas of a nitriding gas and a carburizing gas at 500° C. to 600° C. for 0.5 to 3 hours, taking out the steel material from a furnace, holding the same in air for 60 to 120 seconds to thus form a $Fe_3O_4$ film and then cooling the steel material having the film formed thereon to a room temperature in oil. According to this method, it is possible to continuously perform the nitrocarburizing treatment, the iron oxide layer formation treatment and the cooling treatment, so that it is possible to form the iron oxide layer of a good quality on the surface of the steel material.

However, according to the method disclosed in JP-B-S53-000371, after the nitrocarburizing treatment is performed, the target product is taken out from the furnace, as it is with being heated, the iron oxide layer is thus formed and then the target product is rapidly cooled (oil cooling). Thereby, a crack may be formed in the nitrogen compound layer or the iron oxide layer having $Fe_3O_4$ as the main component. Also, since the target product is cooled in oil, the oil may remain in a plurality of holes formed on the surface of the iron oxide layer.

Therefore, when the vehicular disc brake rotor obtained by the above method is used for a long time, the iron oxide layer having $Fe_3O_4$ as the main component is delaminated at the crack or the oil remains in the holes, so that friction characteristics are highly varied.

Patent Document 1: JP-A-H06-307471
Patent Document 2: JP-A-2010-053926
Patent Document 3: JP-B-3303741
Patent Document 4: JP-A-H03-285058
Patent Document 5: JP-B-S53-000371

SUMMARY OF THE INVENTION

One or more embodiments provide a vehicular disc brake rotor having improved corrosion resistance and wear resistance and having friction characteristics, which are little changed by influences of humidity and temperature, by forming a uniform and compact iron oxide layer including $Fe_3O_4$ on a surface of a soft-nitrided cast-iron friction member configuring the vehicular disc brake rotor with a simple method.

In accordance with embodiments, a vehicular disc brake rotor may include: a cast-iron base; a nitrogen diffusion layer formed on the cast-iron base; a nitrogen compound layer formed on the nitrogen diffusion layer; and an iron oxide layer including $Fe_3O_4$ and formed on the nitrogen compound layer, in which the iron oxide layer may configure a frictional surface. In a burnish and a first re-burnish of a "Passenger car-Braking device-Dynamometer test procedures" (which is based on JASO C 406:2000), a change ratio of a frictional coefficient between the burnish and the first re-burnish may be 10% or less.

In the vehicular disc brake rotor, a standard deviation of a frictional coefficient may be 0.011 or less in a plurality of environment conditions where an absolute humidity is changed within a range of 3 $g/m^3$ to 35 $g/m^3$ and a temperature is changed within a range of 10° C. to 40° C., in any of the burnish and the first re-burnish.

In the vehicular disc brake rotor, a thickness of the nitrogen diffusion layer may be 25 μm to 450 μm, a thickness of the nitrogen compound layer is 5 μm to 25 μm and a thickness of the iron oxide layer is 2 μm to 7 μm. A ratio of an area of pore parts to an entire area of a surface of the iron oxide layer may be 15% or less.

In the vehicular disc brake rotor, a mode of statistics of hole diameters of the pore parts may be 2 μm or less.

In the vehicular disc brake rotor, there may be no crack in any of the nitrogen compound layer and the iron oxide layer.

Moreover, in accordance with embodiment, the vehicular disc brake rotor may be manufactured by: performing a gas nitrocarburizing treatment for a surface of a cast workpiece, at a treatment temperature of 500° C. to 590° C. to thus form a nitrogen diffusion layer and a nitrogen compound layer, and after performing the gas nitrocarburizing treatment and when a temperature becomes 400° C. to 480° C., exposing the workpiece to an atmosphere and cooling the workpiece to a room temperature to thus form an iron oxide layer including $Fe_3O_4$ on a surface of the nitrogen compound layer.

According to embodiments, it is possible to provide the vehicular disc brake rotor having excellent corrosion resistance and wear resistance and friction characteristics that are little changed by influences of humidity and temperature and capable of keeping stable brake performance for a long time and preventing rust from being formed, which deteriorates an outward appearance of the rotor. Thus, the industrial meaning thereof is very great.

DETAILED DESCRIPTION OF THE EMBODIMENTS

1. Vehicular Disc Brake Rotor

Figure 1A:
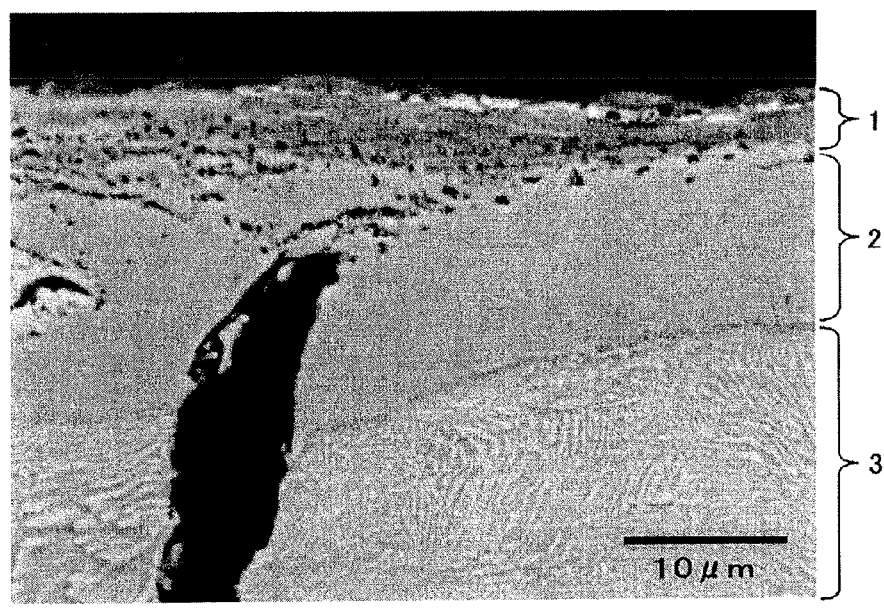
FIG. 1A shows a section SEM photograph in the vicinity of a surface of a vehicular disc brake rotor obtained in an example 1.

A vehicular disc brake rotor of exemplary embodiments has a structure of a nitrogen diffusion layer formed on a cast-iron base, a nitrogen compound layer formed on the nitrogen diffusion layer and an iron oxide layer having $Fe_3O_4$ as a main component formed on the nitrogen compound layer where the iron oxide layer having $Fe_3O_4$ as a main component configures a frictional surface.

Also, regarding the vehicular disc brake rotor of the exemplary embodiments, a vehicular disc brake rotor having a diameter of 200 mm to 420 mm and a thickness of 10 mm to 40 mm will be exemplified although the sizes are not particularly limited.

(1) Cast-iron Base

The vehicular disc brake rotor of the exemplary embodiments is formed by a casting method such as sand mold casting and the like, and gray cast-iron or ductile cast-iron such as FC200, FC250, FCD450 and the like can be used as a cast-iron base thereof.

(2) Nitrogen Diffusion Layer

The nitrogen diffusion layer, which is one of layers configuring the vehicular disc brake rotor of the exemplary embodiments, is a layer that is formed as nitrogen dissolves in the cast-iron base in a supersaturated solid solution state when the gas nitrocarburizing treatment as described later is performed. A thickness of the nitrogen diffusion layer is adjusted to be preferably 25 μm to 450 μm, more preferably 50 μm to 430 μm. When the thickness of the nitrogen diffusion layer is smaller than 25 μm, a thickness of the nitrogen compound layer may not be made to be sufficiently thick. On the other hand, when the thickness of the nitrogen diffusion layer exceeds 450 μm, the time during which the gas nitrocarburizing treatment is performed is prolonged, so that the productivity is lowered.

(3) Nitrogen Compound Layer

Since the nitrogen compound layer, which is one of layers configuring the vehicular disc brake rotor of the exemplary embodiments, is a layer of $Fe_3N$ and the like and is very hard, it can provide the frictional surface with high wear resistance and corrosion resistance. In particular, since it is premised that the nitrogen compound layer of the exemplary embodiments is formed by the gas nitrocarburizing treatment, as described later, it is possible to make a surface thereof smooth.

On the other hand, when the nitrogen compound layer is formed by the salt-bath nitrocarburizing treatment, a porous layer is formed in the vicinity of a surface thereof. When the porous layer is formed, an initial wear amount of the vehicular disc brake rotor is increased and a frictional coefficient is largely changed as outside environments are changed, so that it is not possible to acquire stable braking characteristics. Also, a noise is generated upon braking.

A thickness of the nitrogen compound layer is appropriately selected, based on sizes, using conditions and the like of the vehicular disc brake rotor. For example, for the above sizes, the thickness of the nitrogen compound layer is preferably 5 μm to 25 μm, more preferably 10 μm to 20 μm. When the thickness of the nitrogen compound layer is smaller than 5 μm, it is not possible to acquire the sufficient corrosion resistance and wear resistance. On the other hand, when the thickness of the nitrogen compound layer exceeds 25 μm, the further effect cannot be secured and the time during which the gas nitrocarburizing treatment is performed is prolonged, so that the productivity is lowered.

(4) Iron Oxide Layer Having $Fe_3O_4$ as Main Component

The uniform and compact iron oxide layer having $Fe_3O_4$ as a main component is formed on the surface of the nitrogen compound layer. In the vehicular disc brake rotor having the iron oxide layer formed, it is possible to further improve the high wear resistance and corrosion resistance given by the nitrogen compound layer. Therefore, even when the vehicular disc brake rotor is exposed to the outside environments for a long time, it is possible to effectively prevent red rust ($Fe_2O_3$) from being formed on the surface thereof. Therefore, it is possible to stably maintain the braking characteristics and to prevent an outward appearance of a vehicle from being deteriorated.

A thickness of the iron oxide layer is preferably 2 μm to 7 μm, more preferably 3 μm to 6 μm. When the thickness of the iron oxide layer is smaller than 2 μm, it is not possible to acquire the sufficient corrosion resistance and wear resistance. On the other hand, when the thickness of the iron oxide layer exceeds 7 μm, the further effect cannot be secured.

Also, according to the exemplary embodiments, after the nitrocarburizing treatment, the rotor is furnace-cooled to a predetermined temperature and is exposed to atmosphere and the cooling rate in air is controlled within a defined range, as described below. After that, the iron oxide layer having $Fe_3O_4$ as a main component is formed. Therefore, a crack due to thermal shock accompanied by the cooling is not caused in the iron oxide layer and the nitrogen compound layer.

According to the technology disclosed in JP-B-S53-000371, for example, since the crack is a little present, the iron oxide layer is delaminated or has a deficit at the crack due to the influences of the temperature and humidity and rainwater and the like reaches the nitrogen diffusion layer, further the cast-iron base through the crack. As a result, it is difficult to maintain the friction and outward appearance characteristics of the vehicular disc brake rotor for a long time. Compared to this, the vehicular disc brake rotor of the exemplary embodiments has remarkably improved resistance characteristics to the temperature and humidity, because there is no crack in the iron oxide layer and the nitrogen compound layer.

(5) Pore Area Ratio of Surface

In the vehicular disc brake rotor of the exemplary embodiments, a ratio (hereinafter, referred to as 'pore area ratio') of an area of the pore parts to an entire area of the surface thereof is preferably 15% or less, more preferably 10% or less. Here, the pore area ratio is calculated as follows. That is, a photograph image of a surface of the vehicular disc brake rotor is binarization-processed using image analysis software so that a pore part is black and the other part is white. The pore part (black part) of the image (hereinafter, referred to as 'binarization-processed image') obtained by the processing is measured as a diameter (a circle-equivalent diameter) of a circle having the same area as that of the pore part and is set as a hole diameter of the pore part. From the hole diameter, an area of the pore part is calculated, so that an area ratio of the pore part in the binarization-processed image is calculated. The area ratio is calculated for 25 views (25 SEM photographs) per one sample and a value that is obtained by averaging the area ratios is set as the pore area ratio.

In the exemplary embodiments, the gas nitrocarburizing treatment that will be described later is performed for the vehicular disc brake rotor, based on appropriate conditions, so that the pore area ratio is controlled within a defined range. In the meantime, when the pore area ratio of the surface exceeds 15%, i.e., when the vehicular disc brake rotor is subject to the salt-bath nitrocarburizing treatment, so that the iron cast base is eroded in the vicinity of the surface and a porous layer is thus formed, an initial wear amount of the vehicular disc brake rotor is large and the red rust ($Fe_2O_3$) is formed or the noise is generated upon braking.

Also, the hole diameter of the pore part is preferably 2 μm or less, more preferably 0.7 μm or less and most preferably 0.5 μm or less as a mode of statistics. When the hole diameter exceeds 2 μm, the water encroaches to the nitrogen diffusion layer at the pore part, so that the red rust ($Fe_2O_3$) may be formed, even though the pore area ratio is less than 15%. Here, the mode of the statistics means a value, which most frequently appears, of the hole diameters measured from the binarization-processed images of 25 views.

(6) Frictional Coefficient and Change Ratio Thereof

As described above, the vehicular disc brake rotor of the exemplary embodiments has the structure where the nitrogen diffusion layer, the nitrogen compound layer and the iron oxide layer including $Fe_3O_4$ are disposed on the cast-iron base and controls the surface texture thereof. Thereby, the rotor has a feature that in a burnish (burnish after a first effectiveness test) and a first re-burnish (burnish after a second effectiveness test) of "Passenger car-Braking device-Dynamometer test procedures" (which is based on JASO C 406:2000) (hereinafter, referred to as 'friction test'), a change ratio ($\gamma$) of a frictional coefficient between the burnish and the first re-burnish is less than 10%, preferably 9% and more preferably 8%. When the change ratio exceeds 10%, it is difficult to keep the stable braking characteristics as regards the change in the outside environments.

Also, the change ratio ($\gamma$) means a value that is obtained by an equation $\gamma\ (\%)=(\mu_1-\mu_0)/\mu_0 \times 100$ where $\mu_0$ is a frictional coefficient obtained by the burnish and $\mu_1$ is a frictional coefficient obtained by the first re-burnish in the friction test under each environment condition.

Also, the vehicular disc brake rotor of the exemplary embodiments has a feature that the frictional coefficient is little changed even when the environment conditions of the absolute humidity and/or temperature are changed in the burnish and the first re-burnish. More specifically, in any of the burnish and the first re-burnish, a standard deviation ($\sigma$) of the frictional coefficient is 0.011 or less in a plurality of environment conditions where the absolute humidity is changed within a range of 3 g/m³ to 35 g/m³ and the temperature is changed within a range of 10° C. to 40° C., and the surface texture of the rotor can be kept at the high performance, irrespective of situations where the vehicular disc brake rotor is preserved as a product. When a value of the standard deviation ($\sigma$) exceeds 0.011, the surface texture is changed depending on the situations where the vehicular disc brake rotor is preserved or environment conditions upon using, so that the stable braking characteristics may not be maintained.

In the exemplary embodiments, the friction test means a test in which the first effectiveness test is performed within a range of the braking deceleration of 2.94 m/s$^2$ to 7.35 m/s$^2$ at initial braking speeds of 50 km/h and 100 km/h, the burnish is performed at the initial braking speeds of 65 km/h and the braking deceleration of 3.5 m/s$^2$ so as to tame the surface of the vehicular disc brake rotor, the second effectiveness test is performed within a range of the braking deceleration of 2.94 m/s$^2$ to 7.35 m/s$^2$ at each of the initial braking speeds of 50 km/h, 100 km/h and 130 km/h and the first re-burnish is performed at the initial braking speeds of 65 km/h and the braking deceleration of 3.5 m/s$^2$.

In the friction test, the burnish is a test that is performed so as to tame surface textures of both the rotor and a brake pad becoming an opposite member so as to bring the vehicular disc brake rotor into sufficient contact with the brake pad. Also, a surface of the vehicular disc brake rotor that has been subject to the burnish and the second effectiveness test is formed with a fine crack or fine powders are attached thereto because heat is applied thereto due to the burnish and the second effectiveness test. Thus, the first re-burnish is performed so as to again tame the vehicular disc brake rotor and the brake pad after removing the fine crack and fine powders.

(7) Wear Amount

Regarding the vehicular disc brake rotor of the exemplary embodiments, a general non-asbestos-based brake pad can be used as the opposite material to the rotor in the burnish and the first re-burnish of the friction test. In this case, even when the environment conditions such as absolute humidity and/or temperature are changed, it is possible to limit a wear amount of the vehicular disc brake rotor to a predetermined value or less. In particular, when the absolute humidity is changed within a range of 3 g/m$^3$ to 35 g/m$^3$ and the temperature is changed within a range of 10° C. to 40°, it is possible to make an average value of the wear amount of the vehicular disc brake rotor be preferably 2.35 μm or less, more preferably 2.30 μm or less.

2. Method of Manufacturing Vehicular Disc Brake Rotor

A method of manufacturing an iron-cast friction member of the exemplary embodiments includes a process (hereinafter, referred to as a gas nitrocarburizing treatment process) of performing a gas nitrocarburizing treatment for a cast workpiece, which is obtained by a casting method, at a treatment temperature of 500° C. to 590° C. to thus form a nitrogen diffusion layer and a nitrogen compound layer on a surface of the iron case base and a process (hereinafter, referred to as an iron oxide layer forming process) of, when an atmosphere temperature becomes 400° C. to 480° C. after the gas nitrocarburizing process, exposing the workpiece to an atmosphere and cooling the same to a room temperature under oxygen to thus form an iron oxide layer having $Fe_3O_4$ as a main component on a surface of the nitrogen compound layer.

In the exemplary embodiments, since the process of forming a cast workpiece can be performed by conventional methods, the descriptions thereof are omitted and the gas nitrocarburizing treatment process and the iron oxide layer forming process, which are features of the exemplary embodiments, are described.

(1) Forming Process

In order to remove residual stress after acquiring a workpiece by the casting method, the forming process is to perform a heat treatment at a heating temperature of 600° C. to 700° and to perform a cutting work for a surface and the like. The respective conditions of the forming process are basically the same as those of the related art.

Also, it is preferable to perform the heat treatment after leaving the workpiece alone for one week to two weeks, instead of immediately performing the heat treatment after acquiring the workpiece by the casting method. Like this, the heat treatment is performed after the workpiece is left along for a predetermined time period and the cutting work is further performed, so that a load is reduced in the cutting process. Although the reason is not clear, it is thought that the outermost surface of the workpiece is nitrided by the nitrogen in the air.

(2) Gas Nitrocarburizing Treatment Process

As the nitrocarburizing treatment method, a salt-bath nitrocarburizing treatment method, a gas nitrocarburizing treatment method, a plasma nitrocarburizing treatment method and the like may be exemplified. However, it is necessary to perform the nitrocarburizing treatment by the gas nitrocarburizing treatment method, from a standpoint of formation of the uniform nitrogen diffusion layer and nitrogen compound layer.

The salt-bath nitrocarburizing treatment method has the problems in terms of safety and environmental load, as described above. In addition, the surface of the vehicular disc brake rotor is eroded, so that a porous layer is apt to be formed in the vicinity of a surface of a compound layer to be formed. Thus, when the vehicular disc brake rotor for which the surface treatment has been performed by the salt-bath nitrocarburizing treatment is actually used in a vehicle, an initial wear amount is large and a noise is generated upon braking. Also, according to the plasma nitrocarburizing treatment method, a treatment in a reduced pressure (vacuum) is required, so that a large facility is required. Also, the power is much consumed, so that the operating cost of the facility is increased.

In the gas nitrocarburizing treatment method, a gas nitriding furnace of the related art can be used. Also, the gas nitrocarburizing treatment conditions should be appropriately regulated depending on a power and the like of the gas nitriding furnace to be used. However, the gas nitrocarburizing treatment method is preferably performed under following conditions, from a standpoint of controlling the thicknesses of the nitrogen diffusion layer and nitrogen compound layer within the above-described ranges.

The treatment temperature is preferably set to be 500° C. to 590° C., more preferably 530° C. to 590° C. When the treatment temperature is lower than 500° C., it is not possible to form a nitrogen compound layer and a nitrogen compound layer having a sufficient thickness. On the other hand, when the treatment temperature exceeds 590° C., brittle austenite is formed in the cast-iron base, so that the nitrogen diffusion layer and the nitrogen compound layer may not be stably formed.

Also, the treatment temperature is held preferably for 0.5 to 4 hours, more preferably 1 to 3 hours. When the treatment time is less than 0.5 hour, it is not possible to form a nitrogen diffusion layer and a nitrogen compound layer having a sufficient thickness. On the other hand, even when the treatment time exceeds 4 hours, the nitrogen diffusion layer and the nitrogen compound layer do not substantially grow any more, so that the productivity is lowered.

As a nitrogen supply source, $NH_3$ that is a nitriding gas may be used. In the meantime, a carbon supply source is not particularly limited insomuch as it is a carburizing gas, for example, hydrocarbon containing alcohol such as $CH_3OH$ or $CO$, $CO_2$ and the like may be used. In particular, it is preferable to supply nitrogen and carbon by a mixed gas of NH$_3$ and CH$_3$OH from a standpoint of effectively forming the nitrogen diffusion layer and nitrogen compound layer at low cost. In this case, a flow rate of NH$_3$ is preferably 4.5 m$^3$/h to 5.5 m$^3$/h and a flow rate of CH$_3$OH is preferably 3.0×10$^{-5}$ m$^3$/h to 1.0×10$^{-4}$ m$^3$/h.

A pressure in the gas nitriding furnace is preferably adjusted to be higher than the atmospheric pressure by 0.2 kPa to 1.0 kPa, typically 0.5 kPa to 0.7 kPa, like the general gas nitrocarburizing treatment.

(2) Iron Oxide Layer Forming Process

The iron oxide layer forming process is a process of forming an iron oxide layer having Fe$_3$O$_4$ as a main component on a surface of the obtained nitrogen compound layer after the nitrocarburizing treatment process. Since the iron oxide layer is very uniform and compact, it is possible to reduce influences of humidity and temperature, compared to a configuration where only the nitrocarburizing treatment is performed. Thereby, it is possible to keep the corrosion resistance and wear resistance of the vehicular disc brake rotor at high levels for a long period. Particularly, in the exemplary embodiments, since it is possible to form the iron oxide layer without using a special apparatus and without via a complex process, it is possible to suppress the deterioration of the productivity and the cost increase, which are accompanied as the iron oxide layer is formed, to the minimum, so that the industrial meaning thereof is very great.

Specifically, after the nitrocarburizing treatment, when the atmosphere temperature becomes 400° C. to 480° C., preferably 410° C. to 470° C., more preferably 420° C. to 460° C., the vehicular disc brake rotor is taken out from the gas nitrocarburizing furnace, is thus exposed to the atmosphere and is then cooled to the room temperature (20° C. to 25° C.) while keeping the contact state with oxygen in the atmosphere. The vehicular disc brake rotor is taken out from the gas nitrocarburizing furnace within the above temperature range, so that it is possible to form a uniform and compact iron oxide layer having Fe$_3$O$_4$ as a main component on the surface of the nitrogen compound layer. Also, when the vehicular disc brake rotor is taken out within the above temperature range, it is possible to make a color of the surface thereof bluish, thereby making an outward appearance having excellent decorativeness.

When the temperature at which the vehicular disc brake rotor is taken out is lower than 400° C., oxidizing progress of the nitrogen compound layer is decreased, so that it is not possible to obtain a uniform and compact iron oxide layer having Fe$_3$O$_4$ as a main component. Also, the color of the surface is stained. On the other hand, when the temperature exceeds 480° C., a proportion of Fe$_2$O$_3$ in the iron oxide layer is increased, and a crack is generated in the nitrogen compound layer by rapid oxidation and thermal shock due to a temperature difference.

Also, the exemplary embodiments have a feature that after the vehicular disc brake rotor is taken out from the gas nitrocarburizing furnace, the rotor is continuously exposed to the atmosphere until it is cooled to the room temperature. As described in JP-B-S53-000371, when the target product is kept in the air for predetermined time and is then oil-cooled with being isolated from the oxygen contact, the oil may remain in a plurality of holes formed on the surface of the iron oxide layer, which has an influence on friction characteristics. Thus, the corresponding target product is not suitable for a cast-iron friction member that is used for a sliding part of a vehicular disc brake rotor and the like. Compared to this, according to the exemplary embodiments, since the rotor is slowly cooled to the room temperature with being contacted to the oxygen, the above problems are not caused.

Also, the cooling rate from the exposure of the vehicular disc brake rotor to the atmosphere to the room temperature is preferably 1° C./min to 10° C./min, more preferably 2° C./min to 8° C./min. When the cooling rate is less than 1° C./min, the productivity is deteriorated, and when the cooling rate exceeds 10° C./min, a crack may be formed in the nitrogen compound layer or iron oxide layer. Also, typically, when the vehicular disc brake rotor is kept with being exposed to the atmosphere, it is cooled at the above cooling rate.

EXAMPLES

In the below, the invention is more specifically described by examples. Also, the friction characteristics (frictional coefficient, wear amount) of the vehicular disc brake rotors obtained by examples and comparative examples were evaluated by the friction test that is described later.

<Friction Test>

The brake pad having a composition shown in a table 1 was used and the friction test was performed by a full-size brake dynamometer friction tester under respective environment conditions shown in a table 2. Specifically, as described above, after the first effectiveness test, the burnish, the second effectiveness test and the first re-burnish were performed. As a result, the frictional coefficients were obtained under respective environment conditions in the burnish and the first re-burnish.

Also, in the burnish and the first re-burnish, the wear amounts of the brake pad and the vehicular disc brake rotor were respectively measured under respective environment conditions. At this time, the wear amount of the brake pad was measured by a micrometer (Mitutoyo Corporation, OMV-25M) and the wear amount of the vehicular disc brake rotor was measured by a contracer (Kosaka Laboratory Ltd., DR-200×63).

Also, the respective environment conditions shown in the table 2 were arbitrarily selected from environment conditions, which could be experimentally reproduced, of environment conditions in which a vehicle is generally used. Thus, it should not be construed that the characteristics of the vehicular disc brake rotor of the invention are limited to the environment conditions shown in the table 2.

TABLE 1

| materials | composition (mass %) |
|---|---|
| phenolic resin | 8.1 |
| resin dust | 4.8 |
| barium sulfate | 19.4 |
| calcium hydroxide | 4.8 |
| mica | 8.1 |
| potassium titanate | 16.1 |
| zirconium silicate | 8.1 |
| Fe$_3$O$_4$ | 16.1 |
| graphite | 4.8 |
| aramid fiber | 4.8 |
| inorganic fiber | 4.9 |
| total | 100.0 |

TABLE 2

| environment conditions | No. 1 | No. 2 | No. 3 | No. 4 | No. 5 | No. 6 | No. 7 |
|---|---|---|---|---|---|---|---|
| absolute humidity (g/m$^3$) | 3 | 5 | 7 | 10 | 15 | 20 | 35 |
| temperature (° C.) | 10 | 10 | 10 | 20 | 25 | 30 | 40 |

Example 1

The cast-iron material (equivalent to FC200) was used as the material to cast a vehicular disc brake rotor having a diameter of 355 mm and a thickness of 32 mm and unnecessary parts (sprue, burr and the like) were removed. Then, the obtained vehicular disc brake rotor was subject to the heating treatment at 680° C. Then, a surface of the vehicular disc brake rotor was subject to the cutting work and was degreased by an alcohol-based cleaning agent.

After that, the vehicular disc brake rotor was put into a gas nitrocarburizing furnace (Fujikoshi Corp., EQ-6S type) and the nitrocarburizing treatment was then performed in which the treatment temperature was set to be 570° C. (controlling range: 565° C. to 575° C.) and the holding time at the treatment temperature was set to be 100 minutes (controlling range: 95 minutes to 105 minutes). At this time, ammonia of 5.0 m$^3$/h (controlling range: 4.5 m$^3$/h to 5.5 m$^3$/h) was used as the nitrogen supply source and methanol of 0.05 L/h (controlling range: 0.03 L/h to 0.10 L/h) was used as the carbon supply source.

After the nitrocarburizing treatment was over, the rotor was cooled in the gas nitrocarburizing furnace and was then taken out from the furnace and thus exposed to the atmosphere when the atmosphere temperature became 440° C. Then, the vehicular disc brake rotor was cooled to the room temperature (25° C.) in the atmosphere over 2 hours (cooling rate: 3.45° C./.min.).

Figure 1B:
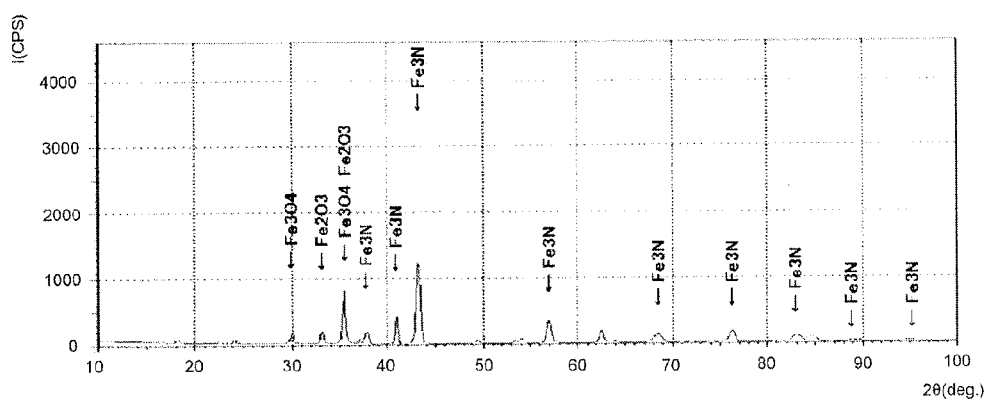
FIG. 1B shows an X-ray diffraction analysis result of the vehicular disc brake rotor obtained in the example 1.

A section in the vicinity of a surface of the obtained vehicular disc brake rotor was observed with a SEM (Nihon Denshi Co., Ltd., JSM-5800 LV). The SEM photograph is shown in FIG. 1A. Also, an analysis result of a composition of the surface, which was obtained by an X-ray diffraction using an X-ray diffraction apparatus (Shimadzu Corporation, XRD6100), is shown in FIG. 1B. Also, a thickness of each layer was measured by a nitride layer depth measuring method of a steel (based on JIS G 0562). It was confirmed in the example 1 that a nitrogen compound layer 2 having a thickness of 15 µm was formed on a nitrogen diffusion layer 3 having a thickness of 150 µm and a uniform and compact iron oxide layer 1 having Fe$_3$O$_4$ as a main component and having a thickness of 4 µm was formed on the nitrogen compound layer 2.

Figure 6A:
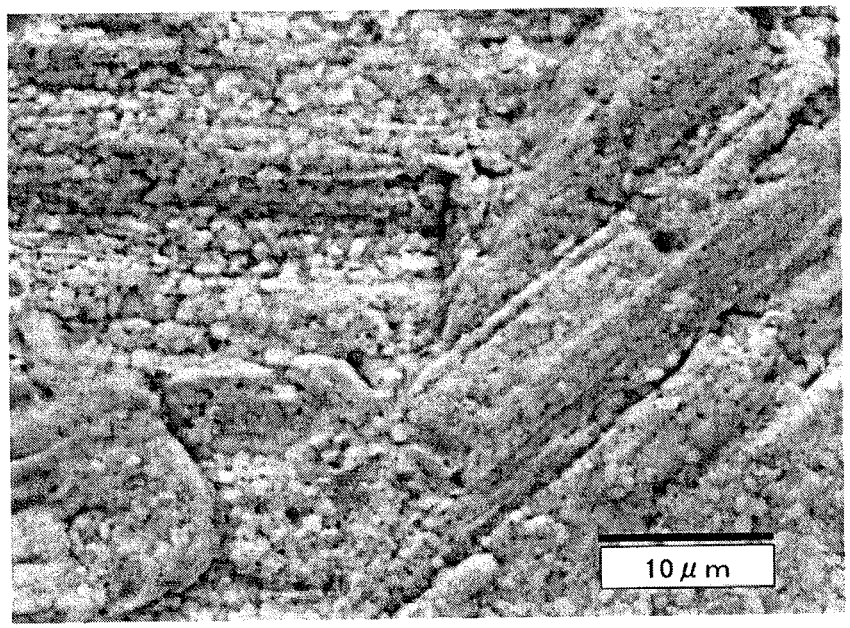
FIG. 6A shows a SEM photograph of a surface of the vehicular disc brake rotor obtained in the example 1.
Figure 6B:
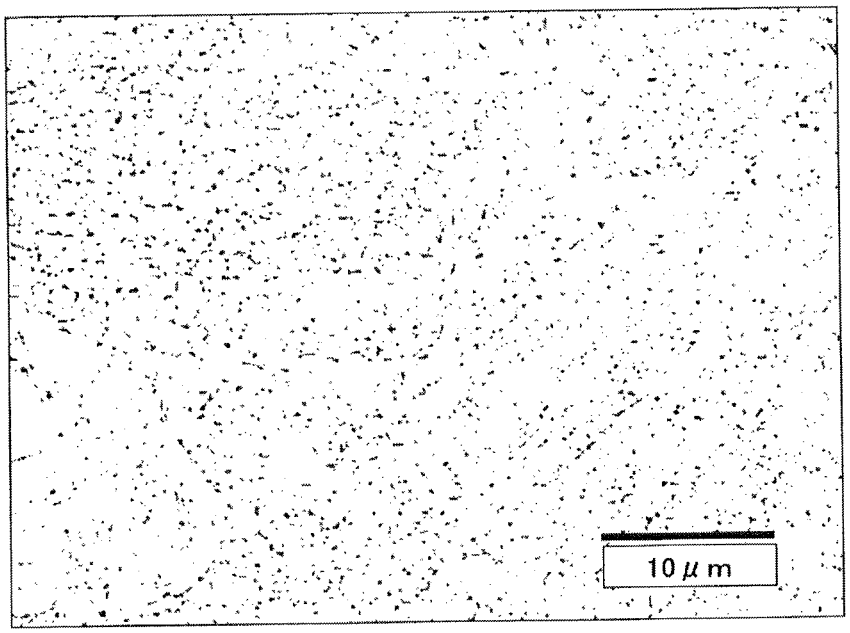
FIG. 6B shows a binarization processed image of the vehicular disc brake rotor obtained in the example 1.

After that, 25 views of the surface of the obtained vehicular disc brake rotor were imaged by the SEM (Nihon Denshi Co., Ltd., JSM-5800 LV) to thus acquire surface images (SEM photographs) of 25 views. The surface images were binarization-processed by an image processing device (Carl Zeiss CO., Ltd., KS400), so that the binarization-processed images of 25 views were obtained. The pore area ratio (average value of 25 views) of the surface obtained from the binarization-processed images was 4% and the hole diameter (the mode) of the pore part was about 0.5 µm. The surface image and the binarization-processed image of the vehicular disc brake rotor obtained at this time are shown in FIGS. 6A and 6B.

Also, the friction test was performed for the vehicular disc brake rotor.

As a result, the change ratio γ, which was obtained from the frictional coefficient $\mu_0$ obtained by the burnish and the frictional coefficient $\mu_1$ obtained by the first re-burnish, was less than about 10% in any environment condition. Also, the wear amount of the vehicular disc brake rotor was average 2.28 µm. Also, the standard deviations (σ) of the frictional coefficient $\mu_0$ of the burnish and the frictional coefficient $\mu_1$ of the first re-burnish were 0.011 and 0.010, respectively. The results are shown in tables 4 and 5.

Example 2

Figure 2A:
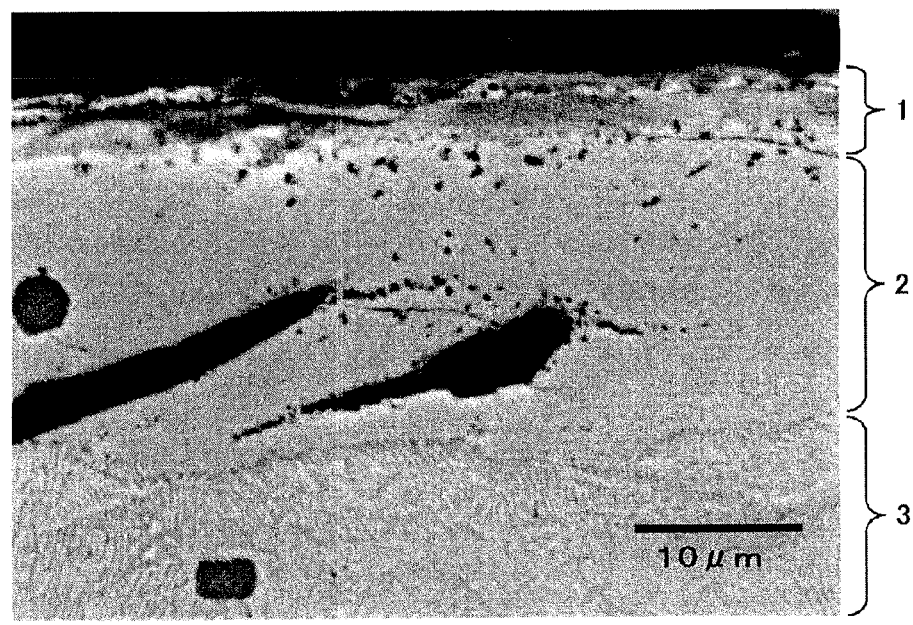
FIG. 2A shows a section SEM photograph in the vicinity of a surface of a vehicular disc brake rotor obtained in an example 2.
Figure 2B:
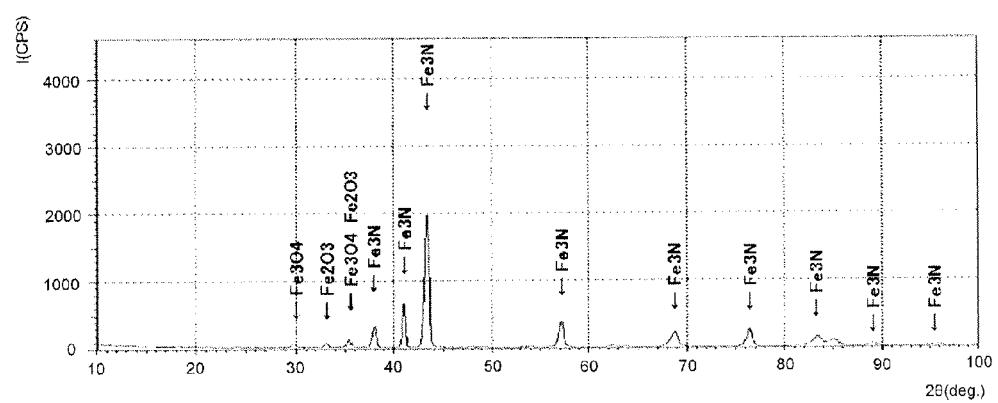
FIG. 2B shows an X-ray diffraction analysis result of the vehicular disc brake rotor obtained in the example 2.

A vehicular disc brake rotor was obtained by the same method as the example 1, except that the rotor was taken out from the furnace and thus exposed to the atmosphere when the atmosphere temperature became 400° C. after the nitrocarburizing treatment. Like the example 1, the SEM observation, the X-ray diffraction analysis and the thickness measurement of the respective layers were performed for the vehicular disc brake rotor. As a result, it was confirmed that a nitrogen compound layer 2 having a thickness of 15 µm was formed on a nitrogen diffusion layer 3 having a thickness of 150 µm and a uniform and compact iron oxide layer 1 having Fe$_3$O$_4$ as a main component and having a thickness of 4 µm was formed on the nitrogen compound layer 2. The results are shown in FIGS. 2A and 2B.

After that, like the example 1, the surface images and binarization-processed images of the vehicular disc brake rotor were obtained and the pore area ratio (an average value of 25 views) of the surface and the hole diameter (the mode) of the pore part were calculated. The results are shown in a table 3.

Also, the same friction test as that of the example 1 was performed for the vehicular disc brake rotor, and the change ratio γ, which was obtained from the frictional coefficients $\mu_0$, $\mu_1$ obtained by the friction test, was less than about 10% in any environment condition. Also, the wear amount of the vehicular disc brake rotor was average 2.23 µm. Also, the standard deviations (σ) of the frictional coefficient $\mu_0$ of the burnish and the frictional coefficient $\mu_1$ of the first re-burnish in the respective environment conditions were 0.011 and 0.010, respectively. The results are shown in the tables 4 and 5.

Example 3

Figure 3A:
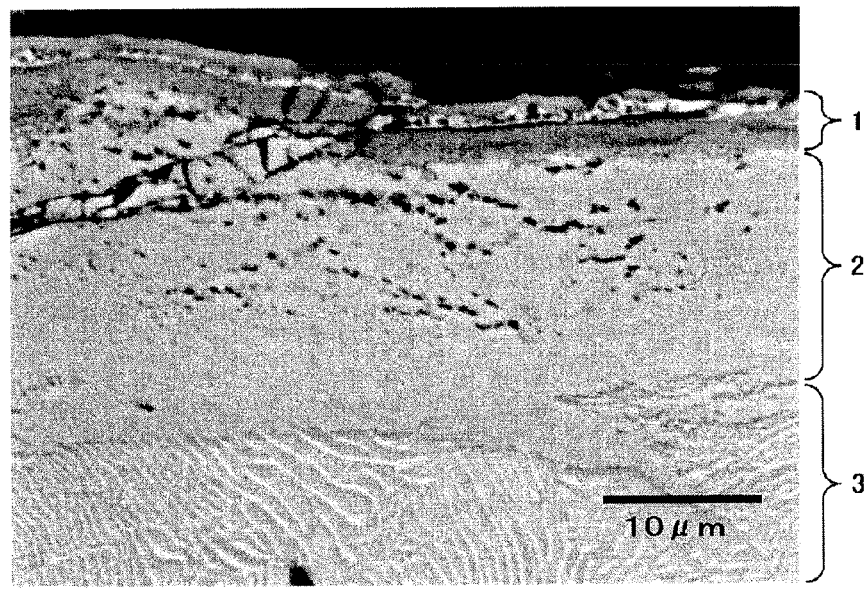
FIG. 3A shows a section SEM photograph in the vicinity of a surface of a vehicular disc brake rotor obtained in an example 3.
Figure 3B:
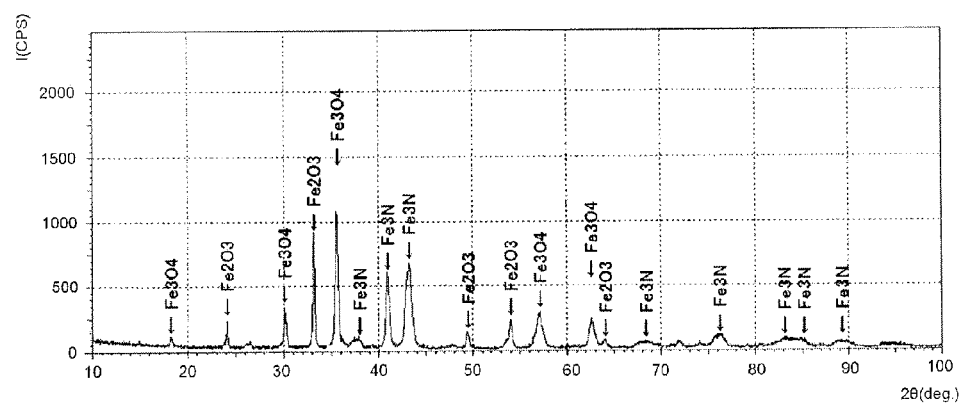
FIG. 3B shows an X-ray diffraction analysis result of the vehicular disc brake rotor obtained in an example 3.

A vehicular disc brake rotor was obtained by the same method as the example 1, except that the rotor was taken out from the furnace and thus exposed to the atmosphere when the atmosphere temperature became 480° C. after the nitrocarburizing treatment. Like the example 1, the SEM observation, the X-ray diffraction analysis and the thickness measurement of the respective layers were performed for the vehicular disc brake rotor. As a result, it was confirmed that a nitrogen compound layer 2 having a thickness of 15 µm was formed on a nitrogen diffusion layer 3 having a thickness of 150 µm and a uniform and compact iron oxide layer 1 having Fe$_3$O$_4$ as a main component and having a thickness of 4 µm was formed on the nitrogen compound layer 2. The results are shown in FIGS. 3A and 3B.

After that, like the example 1, the surface images and binarization-processed images of the vehicular disc brake rotor were obtained and the pore area ratio (an average value of 25 views) of the surface and the hole diameter (the mode) of the pore part were calculated. The results are shown in the table 3.

Also, the same friction test as that of the example 1 was performed for the vehicular disc brake rotor, and the change ratio γ, which was obtained from the frictional coefficients $\mu_0$, $\mu_1$ obtained by the friction test, was less than about 10% in any environment condition. Also, the wear amount of the vehicular disc brake rotor was average 2.32 μm. Also, the standard deviations (σ) of the frictional coefficient $\mu_0$ of the burnish and the frictional coefficient $\mu_1$ of the first re-burnish in the respective environment conditions were 0.010 and 0.010, respectively. The results are shown in the tables 4 and 5.

Comparative Example 1

A vehicular disc brake rotor was obtained by the same method as the example 1, except that the surface treatment such as gas nitrocarburizing treatment was not performed.

Then, like the example 1, the friction test was performed for the obtained vehicular disc brake rotor, and the change ratio γ was obtained from the obtained frictional coefficients $\mu_0$, $\mu_1$. As a result, it was confirmed in some environment conditions that there was the change ratio γ exceeding 10%. Also, the wear amount of the vehicular disc brake rotor was average 2.49 μm. Also, the standard deviations (σ) of the frictional coefficient $\mu_0$ of the burnish and the frictional coefficient $\mu_1$ of the first re-burnish in the respective environment conditions were 0.060 and 0.050, respectively. The results are shown in the tables 4 and 5.

Comparative Example 2

Figure 4A:
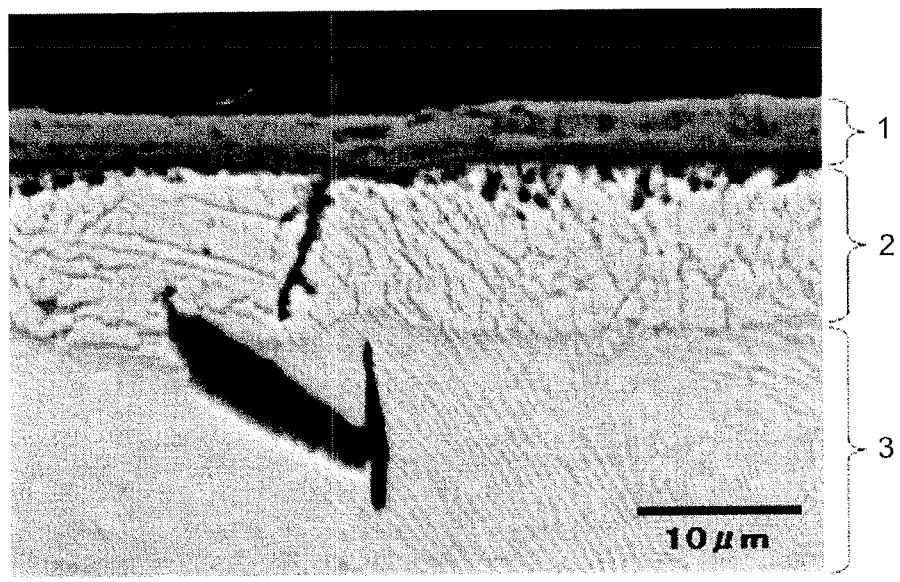
FIG. 4A shows a section SEM photograph in the vicinity of a surface of a vehicular disc brake rotor obtained in a comparative example 2.
Figure 4B:
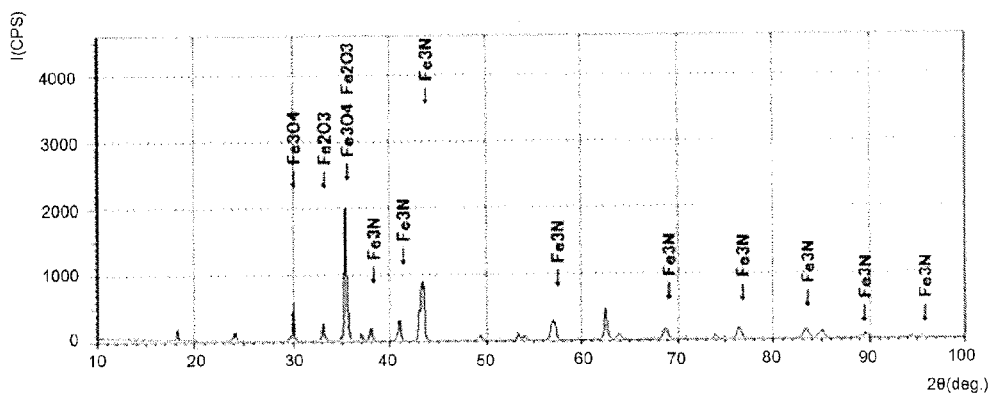
FIG. 4B shows an X-ray diffraction analysis result of vehicular disc brake rotor obtained in the comparative example 2.

A vehicular disc brake rotor was obtained by the same method as the example 1, except that the rotor was taken out from the furnace and thus exposed to the atmosphere when the atmosphere temperature became 500° C. after the nitrocarburizing treatment. Like the example 1, the SEM observation, the X-ray diffraction analysis and the thickness measurement of the respective layers were performed for the vehicular disc brake rotor. As a result, it was confirmed that a nitrogen compound layer 2 having a thickness of 11 μm was formed on a nitrogen diffusion layer 3 having a thickness of 150 μm and a uniform and compact iron oxide layer 1 having $Fe_3O_4$ as a main component and having a thickness of 4 μm was formed on the nitrogen compound layer 2. Also, it was confirmed in the comparative example 2 that a plurality of fine cracks was generated in the nitrogen compound layer 2. The results are shown in FIGS. 4A and 4B.

After that, like the example 1, the surface images and binarization-processed images of the vehicular disc brake rotor were obtained and the pore area ratio (an average value of 25 views) of the surface and the hole diameter (the mode) of the pore part were calculated. The results are shown in the table 3.

Also, the same friction test as that of the example 1 was performed for the vehicular disc brake rotor, and the change ratio γ, which was obtained from the frictional coefficients $\mu_0$, $\mu_1$ obtained by the friction test, was larger than 10% in some environment conditions. Also, the wear amount of the vehicular disc brake rotor was average 2.91 μm. Also, the standard deviations (σ) of the frictional coefficient $\mu_0$ of the burnish and the frictional coefficient $\mu_1$ of the first re-burnish in the respective environment conditions were 0.019 and 0.017, respectively. The results are shown in the tables 4 and 5.

Comparative Example 3

A vehicular disc brake rotor obtained by the same method as the example 1 was subject to a salt-bath nitrocarburizing treatment by degreasing the rotor with an alcohol-based cleaning agent and then immersing the same in a salt-bath having a cyanide concentration of about 20 mass % at 580° C. for 90 minutes. After that, the vehicular disc brake rotor was cooled, water-cleaned and then dried.

Figure 5A:
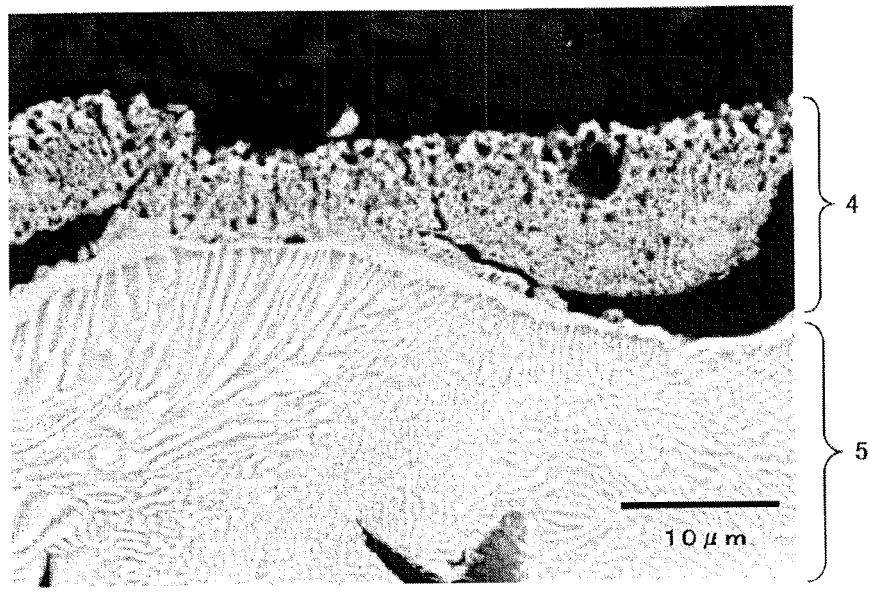
FIG. 5A shows a section SEM photograph in the vicinity of a surface of a vehicular disc brake rotor obtained in a comparative example 3.
Figure 5B:
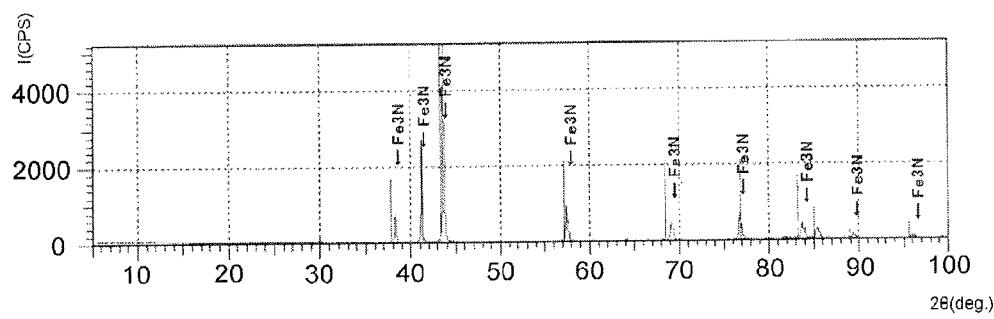
FIG. 5B shows an X-ray diffraction analysis result of the vehicular disc brake rotor obtained in a comparative example 3.

Like the example 1, the SEM observation, the X-ray diffraction analysis and the thickness measurement of the respective layers were performed for the vehicular disc brake rotor. As a result, it was confirmed that a nitrogen compound layer 2 having a thickness of 12 μm was formed on a nitrogen diffusion layer 3 having a thickness of 150 μm but an iron oxide layer 1 having $Fe_3O_4$ as a main component was not formed. Also, it was confirmed in the comparative example 3 that a porous layer was formed in the nitrogen compound layer. The results are shown in FIGS. 5A and 5B.

Figure 7A:
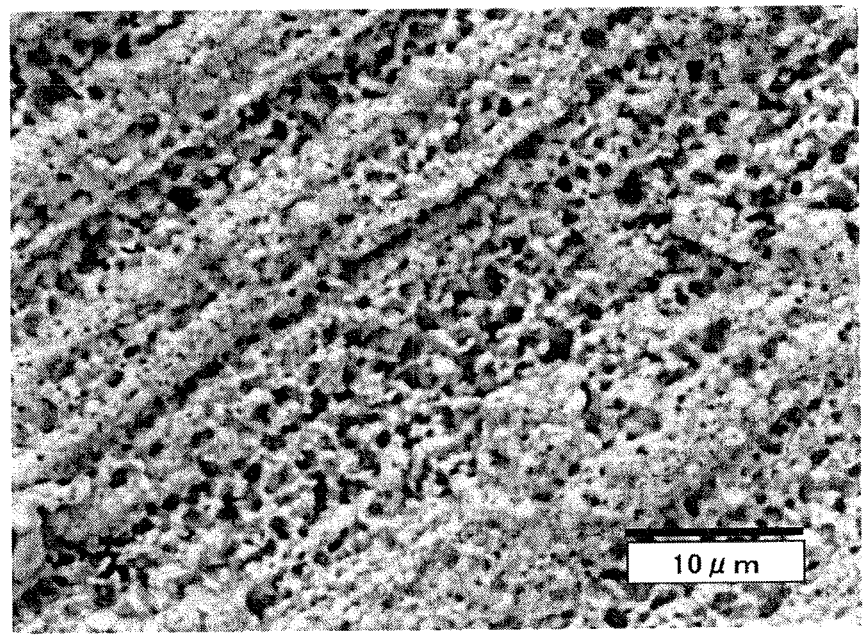
FIG. 7A shows a SEM photograph of a surface of the vehicular disc brake rotor obtained in the comparative example 3.
Figure 7B:
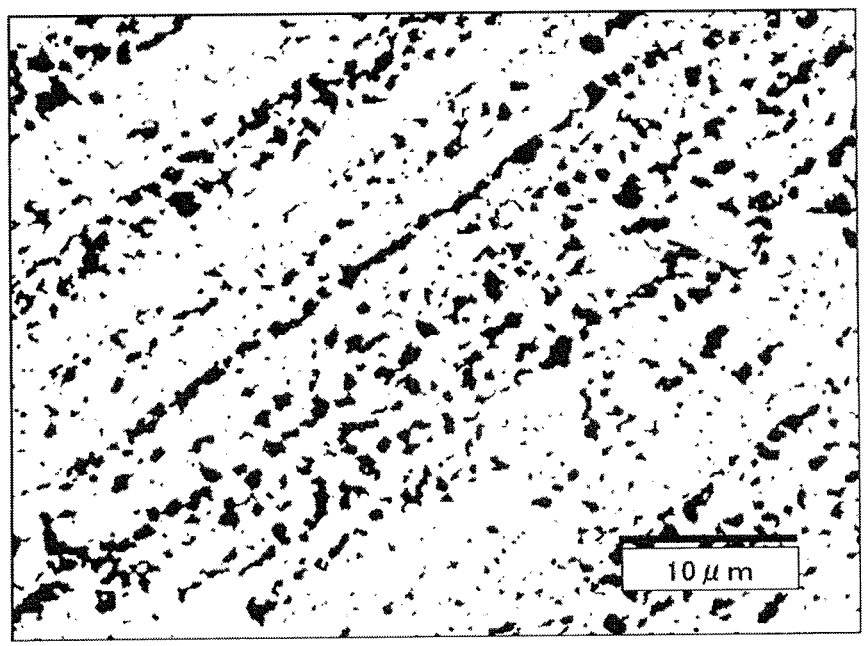
FIG. 7B shows a binarization processed image of the vehicular disc brake rotor obtained in the comparative example 3.

After that, like the example 1, the surface images and binarization-processed images of the vehicular disc brake rotor were obtained and the pore area ratio (an average value of 25 views) of the surface and the hole diameter (the mode) of the pore part were calculated. The results are shown in the table 3. Also, the surface image and the binarization-processed image of the vehicular disc brake rotor obtained at this time are shown in FIGS. 7A and 7B.

Also, the same friction test as that of the example 1 was performed for the vehicular disc brake rotor, and the change ratio γ, which was obtained from the frictional coefficients $\mu_0$, $\mu_1$ obtained by the friction test, was larger than 10% in all the environment conditions. Also, the wear amount of the vehicular disc brake rotor was average 2.40 μm. Also, the standard deviations (σ) of the frictional coefficient $\mu_0$ of the burnish and the frictional coefficient $\mu_1$ of the first re-burnish in the respective environment conditions were 0.013 and 0.011, respectively. The results are shown in the tables 4 and 5.

TABLE 3

| | treatment method | taking out temperature(° C.) | $Fe_3O_4$ peak | nitrogen diffusion layer (μm) | nitrogen compound layer (μm) | $Fe_3O_4$ Layer (μm) | whether or not crack | pore area ratio (%) | hole diameter of pore part (μm) |
|---|---|---|---|---|---|---|---|---|---|
| Example 1 | nitrocarburizing + exposure to atmosphere | 440 | yes | 150 | 15 | 4 | no | 4.0 | 0.5 |
| Example 2 | nitrocarburizing + exposure to atmosphere | 400 | yes | 150 | 15 | 4 | no | 4.0 | 0.5 |
| Example 3 | nitrocarburizing + exposure to atmosphere | 480 | yes | 150 | 15 | 4 | no | 4.0 | 0.5 |
| Comparative Example 1 | no treatment | — | no | — | — | — | no | — | — |

TABLE 3-continued

|  | treatment method | taking out temperature(° C.) | Fe₃O₄ peak | nitrogen diffusion layer (μm) | nitrogen compound layer (μm) | Fe₃O₄ Layer (μm) | whether or not crack | pore area ratio (%) | hole diameter of pore part (μm) |
|---|---|---|---|---|---|---|---|---|---|
| Comparative Example 2 | nitrocarburizing + exposure to atmosphere | 500 | yes | 150 | 11 | 4 | yes | 4.5 | 1.5 |
| Comparative Example 3 | salt-bath treatment | — | no | 150 | 12 | — | no | 17.0 | 2.2 |

TABLE 4

| environment conditions |  | absolute humidity (g/m³) | | | | | | | | |
|---|---|---|---|---|---|---|---|---|---|---|
|  |  | 3 | 5 | 7 | 10 | 15 | 20 | 35 | | |
|  |  | temperature (° C.) | | | | | | | | |
|  |  | 10 | 10 | 10 | 20 | 25 | 30 | 40 | average | σ |
| example 1 | burnish | 0.353 | 0.351 | 0.353 | 0.344 | 0.332 | 0.330 | 0.329 | 0.342 | 0.011 |
|  | first re-burnish | 0.378 | 0.375 | 0.380 | 0.370 | 0.357 | 0.360 | 0.359 | 0.368 | 0.010 |
|  | change ratio (%) | 7.3 | 6.9 | 7.5 | 7.5 | 7.4 | 9.1 | 9.1 | 7.8 | — |
| example 2 | burnish | 0.350 | 0.350 | 0.349 | 0.341 | 0.330 | 0.327 | 0.328 | 0.339 | 0.011 |
|  | first re-burnish | 0.375 | 0.373 | 0.377 | 0.367 | 0.355 | 0.358 | 0.352 | 0.365 | 0.010 |
|  | change ratio (%) | 7.1 | 6.6 | 8.0 | 7.6 | 7.6 | 9.5 | 7.3 | 7.7 | — |
| example 3 | burnish | 0.356 | 0.349 | 0.344 | 0.349 | 0.338 | 0.327 | 0.332 | 0.342 | 0.010 |
|  | first re-burnish | 0.381 | 0.382 | 0.372 | 0.368 | 0.366 | 0.357 | 0.359 | 0.369 | 0.010 |
|  | change ratio (%) | 7.0 | 9.5 | 8.1 | 5.4 | 8.3 | 9.2 | 8.1 | 8.0 | — |
| comparative example 1 | burnish | 0.500 | 0.437 | 0.443 | 0.420 | 0.403 | 0.351 | 0.320 | 0.411 | 0.060 |
|  | first re-burnish | 0.518 | 0.489 | 0.477 | 0.453 | 0.434 | 0.404 | 0.375 | 0.450 | 0.050 |
|  | change ratio (%) | 3.5 | 11.8 | 7.7 | 7.7 | 7.8 | 15.1 | 17.2 | 10.0 | — |
| comparative example 2 | burnish | 0.343 | 0.343 | 0.332 | 0.317 | 0.302 | 0.317 | 0.294 | 0.321 | 0.019 |
|  | first re-burnish | 0.385 | 0.361 | 0.366 | 0.358 | 0.339 | 0.357 | 0.336 | 0.357 | 0.017 |
|  | change ratio (%) | 12.2 | 5.2 | 10.2 | 12.9 | 12.3 | 12.6 | 14.3 | 11.4 | — |
| comparative example 3 | burnish | 0.295 | 0.288 | 0.288 | 0.278 | 0.280 | 0.265 | 0.260 | 0.279 | 0.013 |
|  | first re-burnish | 0.384 | 0.378 | 0.370 | 0.368 | 0.365 | 0.355 | 0.354 | 0.368 | 0.011 |
|  | change ratio (%) | 30.2 | 31.3 | 28.5 | 32.4 | 30.4 | 34.0 | 36.2 | 31.8 | — |

TABLE 5

| environment conditions |  | absolute humidity (g/m³) | | | | | | | | |
|---|---|---|---|---|---|---|---|---|---|---|
|  |  | 3 | 5 | 7 | 10 | 15 | 20 | 35 | | |
|  |  | temperature (° C.) | | | | | | | | |
|  |  | 10 | 10 | 10 | 20 | 25 | 30 | 40 | average | σ |
| example 1 | pad (mm) | 0.330 | 0.324 | 0.316 | 0.313 | 0.318 | 0.324 | 0.322 | 0.321 | 0.006 |
|  | disc (μm) | 2.35 | 2.35 | 2.25 | 2.25 | 2.25 | 2.25 | 2.25 | 2.28 | 0.05 |
| example 2 | pad (mm) | 0.328 | 0.322 | 0.315 | 0.310 | 0.314 | 0.320 | 0.318 | 0.318 | 0.006 |
|  | disc (μm) | 2.33 | 2.30 | 2.20 | 2.20 | 2.20 | 2.20 | 2.20 | 2.23 | 0.06 |
| example 3 | pad (mm) | 0.330 | 0.331 | 0.328 | 0.326 | 0.321 | 0.327 | 0.325 | 0.327 | 0.003 |
|  | disc (μm) | 2.40 | 2.33 | 2.31 | 2.34 | 2.32 | 2.31 | 2.26 | 2.32 | 0.04 |
| comparative example 1 | pad (mm) | 0.374 | 0.335 | 0.295 | 0.280 | 0.266 | 0.248 | 0.230 | 0.290 | 0.050 |
|  | disc (μm) | 3.75 | 3.50 | 3.25 | 2.90 | 1.75 | 1.25 | 1.00 | 2.49 | 1.13 |
| comparative example 2 | pad (mm) | 0.418 | 0.401 | 0.409 | 0.402 | 0.394 | 0.407 | 0.393 | 0.403 | 0.009 |
|  | disc (μm) | 3.09 | 2.86 | 2.99 | 2.86 | 2.87 | 2.99 | 2.71 | 2.91 | 0.12 |
| comparative example 3 | pad (mm) | 0.367 | 0.365 | 0.360 | 0.358 | 0.352 | 0.354 | 0.355 | 0.359 | 0.006 |
|  | disc (μm) | 2.48 | 2.45 | 2.40 | 2.40 | 2.35 | 2.40 | 2.35 | 2.40 | 0.05 |

<Description of Reference Numerals>
1 Iron oxide layer ($Fe_3O_4$ layer)
2 Nitrogen compound layer by gas nitrocarburizing treatment
3 Nitrogen diffusion layer by gas nitrocarburizing treatment
4 Nitrogen compound layer by salt-bath nitrocarburizing treatment
5 Nitrogen diffusion layer by salt-bath nitrocarburizing treatment

What is claimed is:

1. A vehicular disc brake rotor comprising:
a cast-iron base;
a nitrogen diffusion layer formed on the cast-iron base;
a nitrogen compound layer formed on the nitrogen diffusion layer; and
an iron oxide layer including $Fe_3O_4$ and formed on the nitrogen compound layer,
wherein the iron oxide layer configures a frictional surface, the frictional surface having a pore area ratio of an area with pores to an entire area of the frictional surface being 15% or less, and
wherein, in a burnish and a first re-burnish, a change ratio of a frictional coefficient between the burnish and the first re-burnish is 10% or less.

2. The vehicular disc brake rotor according to claim 1, wherein a standard deviation of a frictional coefficient is 0.011 or less in a plurality of environment conditions where an absolute humidity is changed within a range of 3 $g/m^3$ to 35 $g/m^3$ and a temperature is changed within a range of 10° C. to 40° C., in any of the burnish and the first reburnish.

3. The vehicular disc brake rotor according to claim 1, wherein a thickness of the nitrogen diffusion layer is 25 μm to 450 μm, a thickness of the nitrogen compound layer is 5 μm to 25 μm and a thickness of the iron oxide layer is 2 μm to 7 μm.

4. The vehicular disc brake rotor according to claim 3, wherein a mode of statistics of hole diameters of the pore parts is 2 μm or less.

5. The vehicular disc brake rotor according to claim 1, wherein there is no crack in any of the nitrogen compound layer and the iron oxide layer.

6. The vehicular disc brake rotor according to claim 1, wherein a standard deviation of a frictional coefficient is 0.011 or less in a plurality of environment conditions where an absolute humidity is changed within a range of 3 $g/m^3$ to 35 $g/m^3$ and a temperature is changed within a range of 10° C. to 40° C., in any of the burnish and the first re-burnish,
wherein a thickness of the nitrogen diffusion layer is 25 μm to 450 μm, a thickness of the nitrogen compound layer is 5 μm to 25 μm and a thickness of the iron oxide layer is 2 μm to 7 μm,
wherein a mode of statistics of hole diameters of the pore parts is 2 μm or less, and
wherein there is no crack in any of the nitrogen compound layer and the iron oxide layer.

7. The vehicular disc brake rotor according to claim 1, wherein the pore area ratio is 15% or less and greater than zero.

8. A manufacturing method of manufacturing the vehicular disc brake rotor according to claim 1, the manufacturing method comprising:
performing a gas nitrocarburizing treatment for a surface of the cast-iron base, at a treatment temperature of 500° C. to 590° C. to thus form the nitrogen diffusion layer and a nitrogen compound layer, and
when a temperature becomes 400° C. to 480° C. after performing the gas nitrocarburizing treatment, exposing the workpiece to an atmosphere and cooling the workpiece to a room temperature to thus form the iron oxide layer including $Fe_3O_4$ on a surface of the nitrogen compound layer.

* * * * *